(12) United States Patent
Rolson (10) Patent No.: US 10,549,697 B2
(45) Date of Patent: Feb. 4, 2020

(54) PORTABLE LADDER SYSTEM

(71) Applicant: Robert G. Rolson, Foxboro, WI (US)

(72) Inventor: Robert G. Rolson, Foxboro, WI (US)

( * ) Notice: Subject to any disclaimer, the term of this patent is extended or adjusted under 35 U.S.C. 154(b) by 0 days.

(21) Appl. No.: 16/352,380

(22) Filed: Mar. 13, 2019

(65) Prior Publication Data

US 2019/0291648 A1 Sep. 26, 2019

Related U.S. Application Data

(60) Provisional application No. 62/646,444, filed on Mar. 22, 2018.

(51) Int. Cl.
| | | |
|---|---|---|
| *B60R 3/02* | (2006.01) | |
| *B60R 3/00* | (2006.01) | |
| *E06C 5/06* | (2006.01) | |
| *E06C 5/24* | (2006.01) | |
| *E06C 5/44* | (2006.01) | |

(52) U.S. Cl.
CPC ............... *B60R 3/007* (2013.01); *E06C 5/06* (2013.01); *E06C 5/24* (2013.01); *E06C 5/44* (2013.01); *B60Y 2200/147* (2013.01)

(58) Field of Classification Search
CPC .. B60R 3/007; B60R 3/02; B60R 3/00; B60Y 2200/147; E06C 5/06; E06C 5/24; E06C 5/26; E06C 5/04; E06C 5/16; E06C 5/44
USPC .................................................. 280/163, 166
See application file for complete search history.

(56) References Cited

U.S. PATENT DOCUMENTS

| | | |
|---|---|---|
| 2,467,800 A | 4/1949 | Backlin et al. |
| 3,123,178 A | 3/1964 | Monaghan et al. |
| 3,232,376 A | 2/1966 | Lucas et al. |
| 3,291,255 A | 12/1966 | Glatfelter |
| 3,406,784 A | 10/1968 | Jones et al. |
| 3,563,342 A | 2/1971 | Lasiter |
| 3,677,562 A | 7/1972 | Bronstein |
| 3,973,646 A | 8/1976 | Martinez |
| 4,161,997 A | 7/1979 | Norman |
| 4,236,601 A | 12/1980 | Naka |
| 4,245,716 A | 1/1981 | Rayfield |
| 4,333,547 A | 6/1982 | Johansson |
| 4,408,680 A | 10/1983 | Ross |
| 4,492,286 A | 1/1985 | Lemire |
| 4,724,925 A | 2/1988 | Ritten |
| 4,757,876 A | 7/1988 | Peacock |
| 4,815,787 A | 3/1989 | Hale |
| 4,828,074 A | 5/1989 | Combs |
| 4,867,497 A | 9/1989 | Jayne |

(Continued)

OTHER PUBLICATIONS http://landoll.com/home/products/trailers/, printed Jun. 6, 2019.

(Continued)

*Primary Examiner* — John D Walters
(74) *Attorney, Agent, or Firm* — Merchant & Gould P.C.

(57) ABSTRACT

A portable ladder system pivotally mounted to a ladder support member that is configured to be removably secured to the edge of the bed of a truck trailer. The portable ladder system can be mounted to multiple locations along the edge of a bed and does not need to be mounted to a traditionally constructed stake pocket. The portable ladder system can be quickly and easily attached in a locked fashion and detached from the bed without the use of tools.

18 Claims, 11 Drawing Sheets

(56) References Cited

U.S. PATENT DOCUMENTS

| | | | |
|---|---|---|---|
| 4,911,264 A * | 3/1990 | McCafferty | B25H 5/00 |
| | | | 182/150 |
| 5,024,292 A | 6/1991 | Gilbreath et al. | |
| 5,064,022 A | 11/1991 | Graham | |
| 5,163,531 A | 11/1992 | Whiting | |
| 5,190,337 A | 3/1993 | McDaniel | |
| 5,469,933 A | 11/1995 | Thomason | |
| 6,003,633 A * | 12/1999 | Rolson | E06C 5/02 |
| | | | 182/106 |
| 2005/0211502 A1 * | 9/2005 | LaBrash | B60R 3/02 |
| | | | 182/127 |

OTHER PUBLICATIONS

Brochure from Unique-Truck Equipment Catalog, "Safety and Maintenance for Today's Fleets", p. 17 (Spring 1996).

Brochure from Unique-Truck Equipment, Inc., "Summer Savings! on Safety and Maintenance Products for Today's Fleets", p. 6 (1996).

U.S. Patent No. 290,348, dated Dec. 18, 1883, by Olsen.

* cited by examiner

PORTABLE LADDER SYSTEM

CROSS-REFERENCE TO RELATED APPLICATION(S)

The present application claims the benefit of U.S. Provisional Patent Application Ser. No. 62/646,444, filed Mar. 22, 2018, the disclosure of which is hereby incorporated in its entirety.

BACKGROUND

This disclosure relates to portable truck or trailer bed ladders that facilitate a user's access to the bed for loading and unloading. The bed of a truck or trailer can often be about five feet above the ground surface, making it difficult for the operators to climb on and off the bed during loading and unloading without the aid of a ladder. Some trucks and trailer beds have permanently mounted step rails positioned for this purpose. However, a permanently mounted step rail must be mounted so as not to increase the overall width of the trailer in order to comply with highway regulations. Therefore, such step rails are usually positioned vertically beneath the outer edge of the truck frame, which can make it difficult to use them for climbing onto and off of the bed. For safe and convenient ease of access, it is desirable that an access ladder be positioned at an angle that is less than vertical extending in a direction away from the bed. It is also desirable that the ladder be portable so that it can be used at many locations around the trailer bed. Frequently, the trailer has a partial load that can prevent easy access to the trailer bed where the partial load is located. In such circumstances the portability of the ladder is particularly desirable. It is also desirable that the ladder be capable of convenient stowage when not in use.

SUMMARY

The present disclosure comprises a portable ladder system pivotally mounted to a ladder support member that is removably secured to the edge of a bed of a truck trailer. The portable ladder system of the present disclosure can be mounted to multiple locations along the edge of the bed and does not need to be mounted to a traditionally constructed stake pocket. In the depicted embodiment, the portable ladder system can be quickly and easily attached and detached from the bed without the use of tools.

DESCRIPTION OF THE PREFERRED EMBODIMENT

It is a characteristic of most flatbed trucks or truck trailers to have a plurality of regularly spaced apart apertures about the outer periphery of the bed. These apertures can be used to secure stakes and/or can be used to secure chains or straps. These apertures can sometimes simply be rectangular or square holes cut into the edge of the bed. These apertures are sometimes referred to as stake pockets and/or "gotchas". The portable ladder system of the present disclosure is configured to engage the edge of the bed and be secured to the bed via these apertures.

Referring to FIGS. 1-11, the ladder of the present disclosure is described in further detail. In the depicted embodiment, a portable ladder system 10 is shown attached to a bed 12 of a truck/trailer. In the depicted embodiment, the portable ladder system 10 includes a pivoting ladder section 14 supported on a ladder support member 16. The portable ladder system 10 also includes a ladder securing system 18 (FIG. 8) that secures the ladder support member 16 to the bed 12 of a truck/trailer.

In the depicted embodiment, the ladder support member 16 engages an edge of the bed 12. In the depicted embodiment, the ladder support member 16 is a plate 20 that rests on top of a portion of the peripheral edge of the bed 12. In the depicted embodiment, the ladder support member 16 includes a top portion 22 (e.g., top surface of the plate 20), a bottom portion 24 (e.g., bottom surface of the plate 20), an outwardly facing edge portion 26 (e.g., outwardly facing edge of the plate 20), and an inwardly facing edge portion 28 (e.g., inwardly facing edge of the plate 20). The ladder support member 16 is configured such that the bottom portion 24 of the ladder support member 16 rests on the top edge of the bed 12 with the outwardly facing edge portion 26 being further from a center line of the bed 12 than the inwardly facing edge portion 28. In the depicted embodiment, the ladder support member 16 includes downwardly extending tabs 30, 32 along the outwardly facing edge portion 26. In the depicted embodiment, the ladder support member 16 includes two vertically extending grab rails 34, 36. In the depicted embodiment, the grab rails 34, 36 are welded to the plate 20. In addition, the ladder support member 16 of the depicted embodiment includes a pair of ladder support arms 38, 40 (FIG. 5) that extend upwardly from the plate 20, and define a pivot connection between the ladder support member 16 and the pivoting ladder section 14. It should be appreciated that many alternative configurations are possible. For example, the ladder support member 16 could be a rectangular frame comprising a plurality of welded together square tubes with a steel mesh grate instead of a plate 20.

Figure 1:
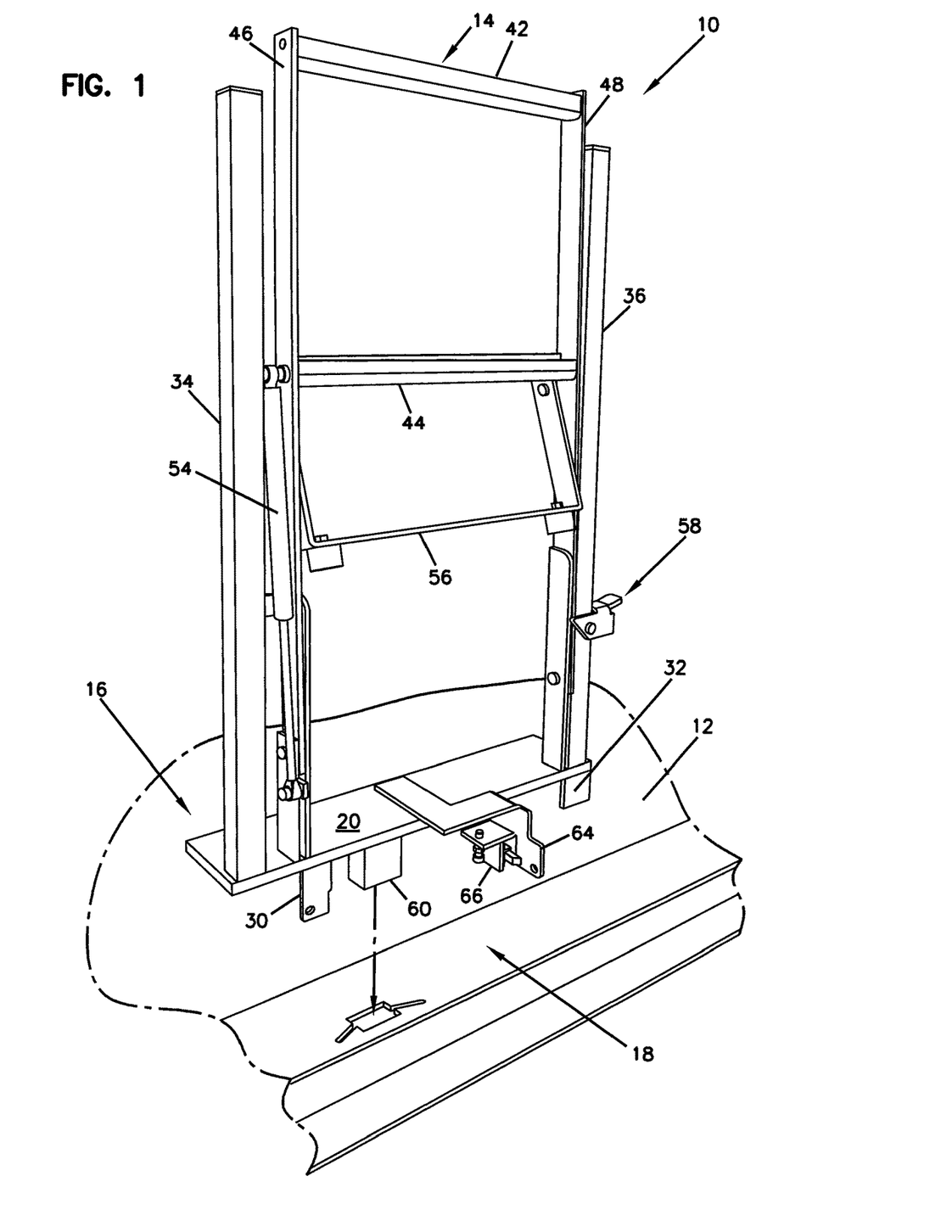
FIG. 1 is a perspective view of an embodiment of the portable ladder system of the present disclosure on a trailer bed wherein the ladder section is in a retracted orientation and the actuating arm is in a first unlocked position.
Figure 2:
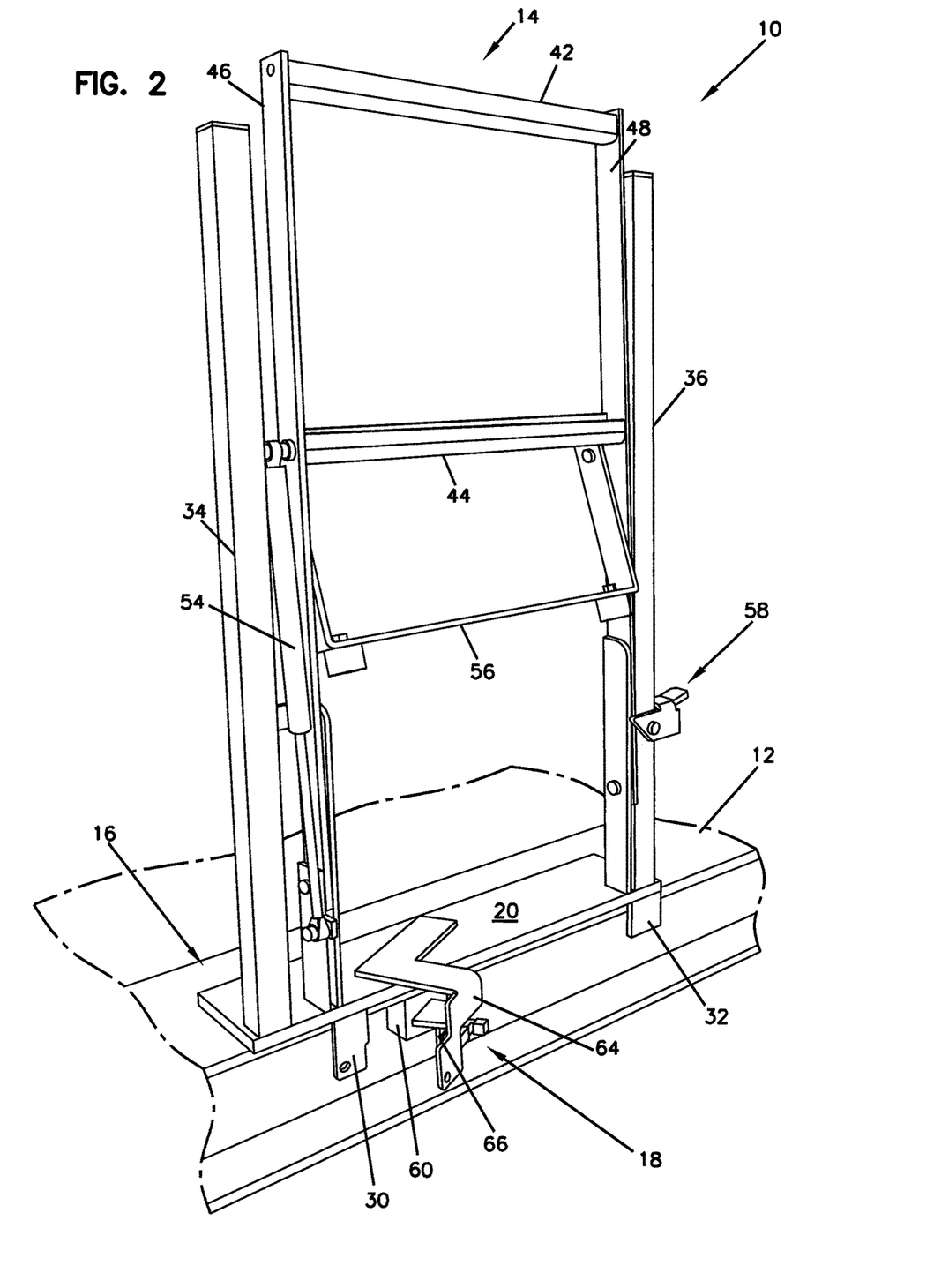
FIG. 2 is a perspective view of the portable ladder system of FIG. 1 wherein the ladder section is in a retracted orientation and the actuating arm is in a second unlocked position.
Figure 3:
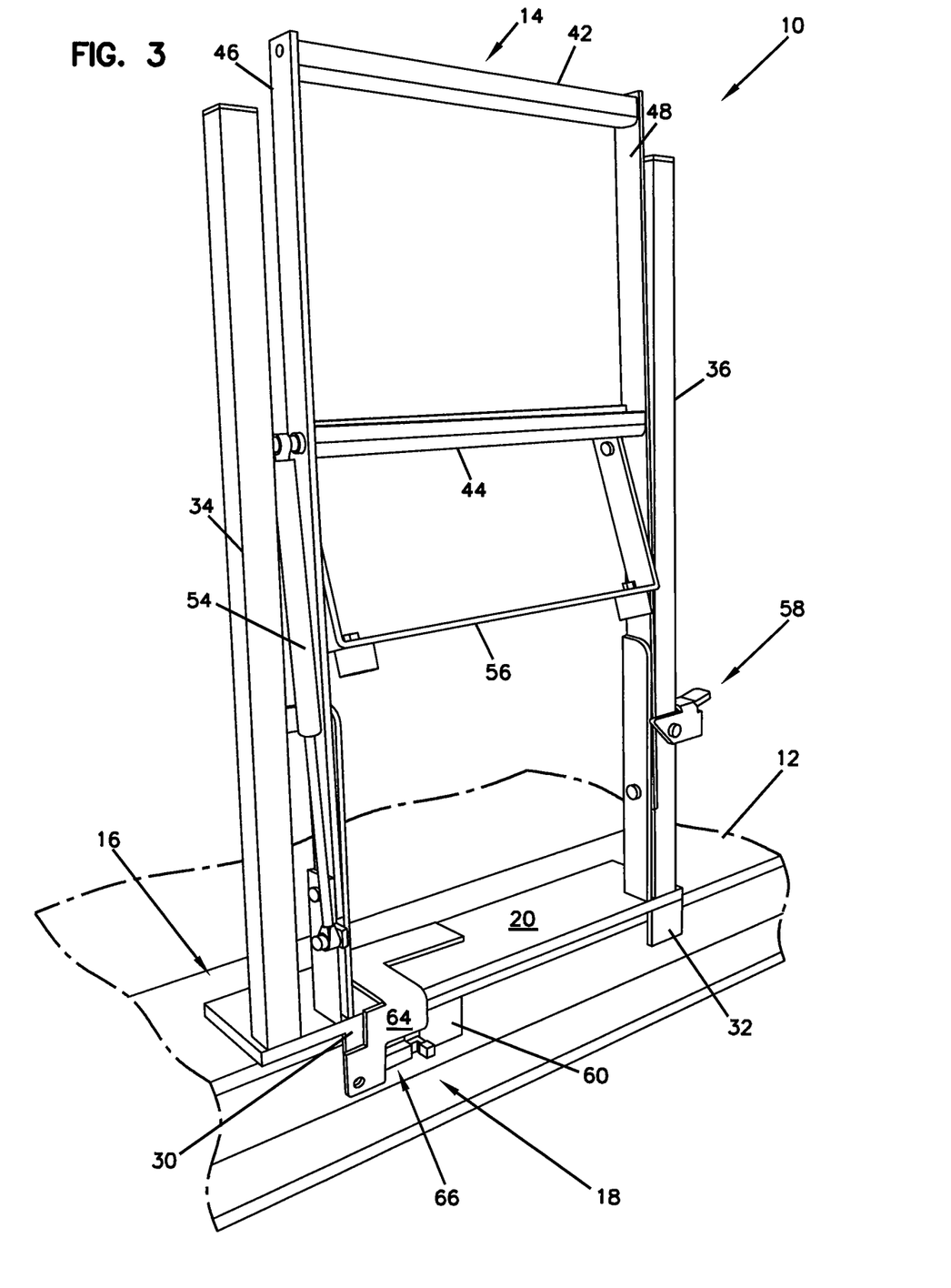
FIG. 3 is a perspective view of the portable ladder system of FIG. 1 wherein the ladder section is in a retracted orientation and the actuating arm is in a locked position.
Figure 4:
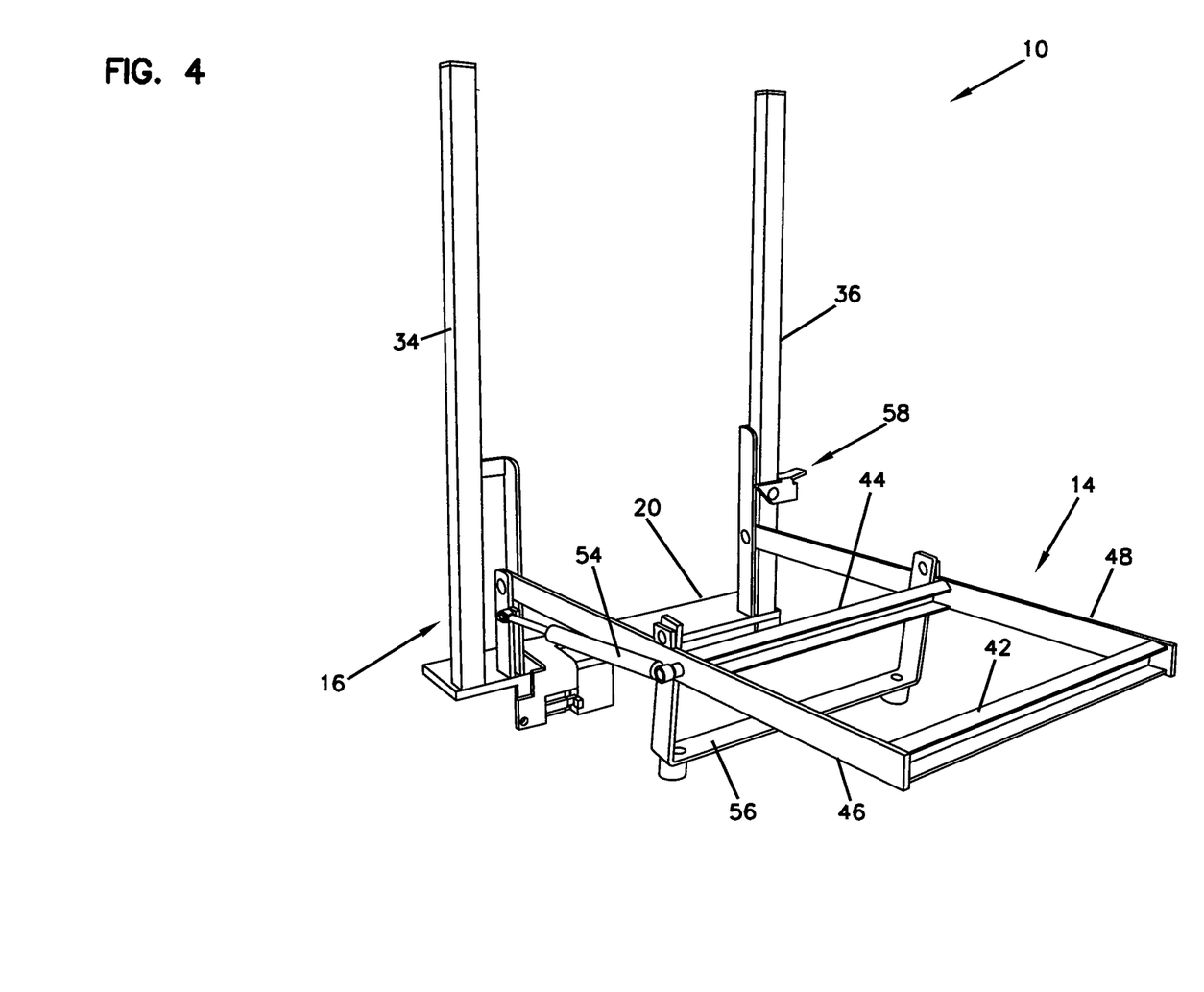
FIG. 4 is a perspective view of the portable ladder system of FIG. 1 wherein the ladder section is in a partially deployed orientation and the actuating arm is in a locked position.
Figure 5:
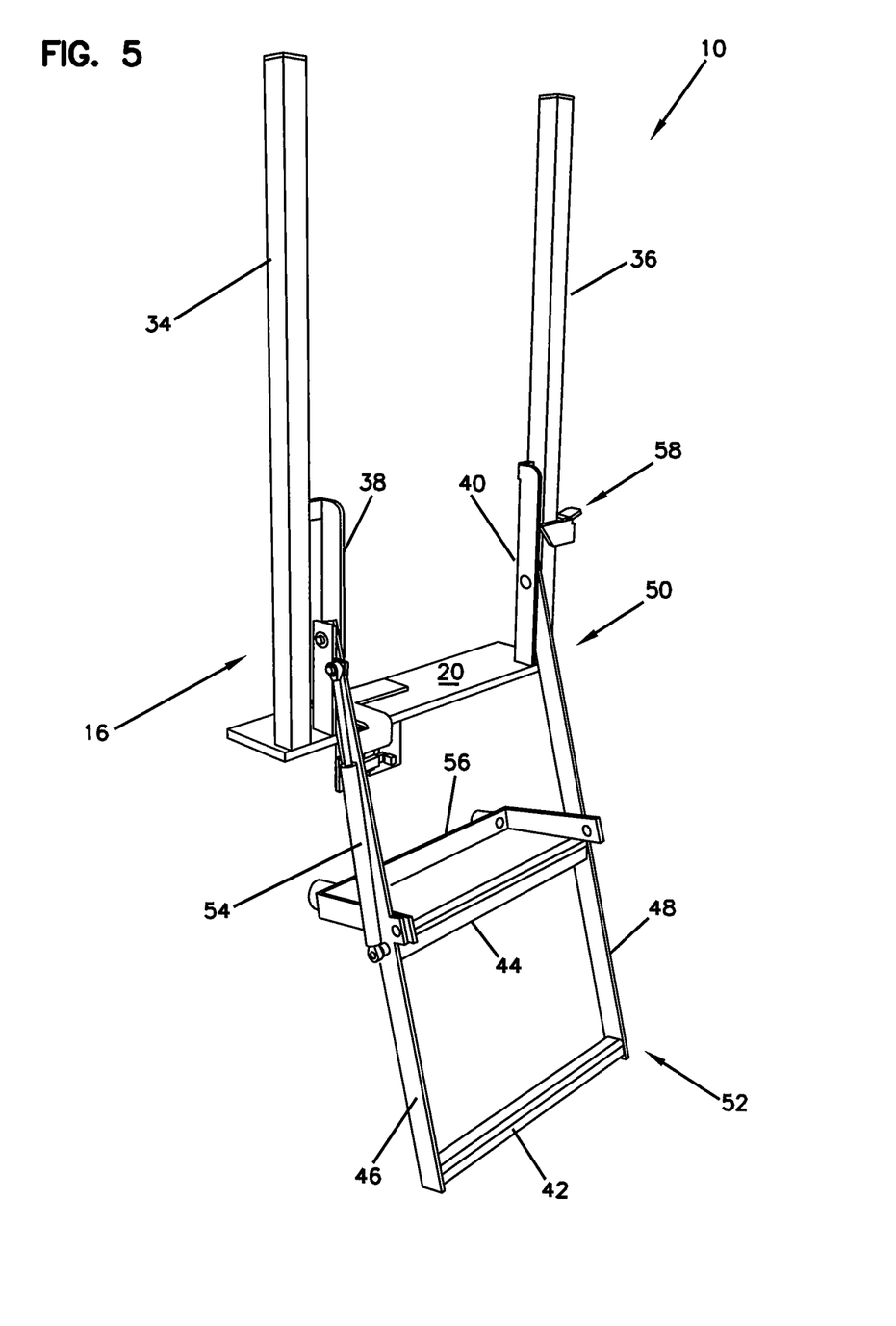
FIG. 5 is a perspective view of the portable ladder system of FIG. 1 wherein the ladder section is in a fully deployed orientation and the actuating arm is in a locked position.
Figure 6:
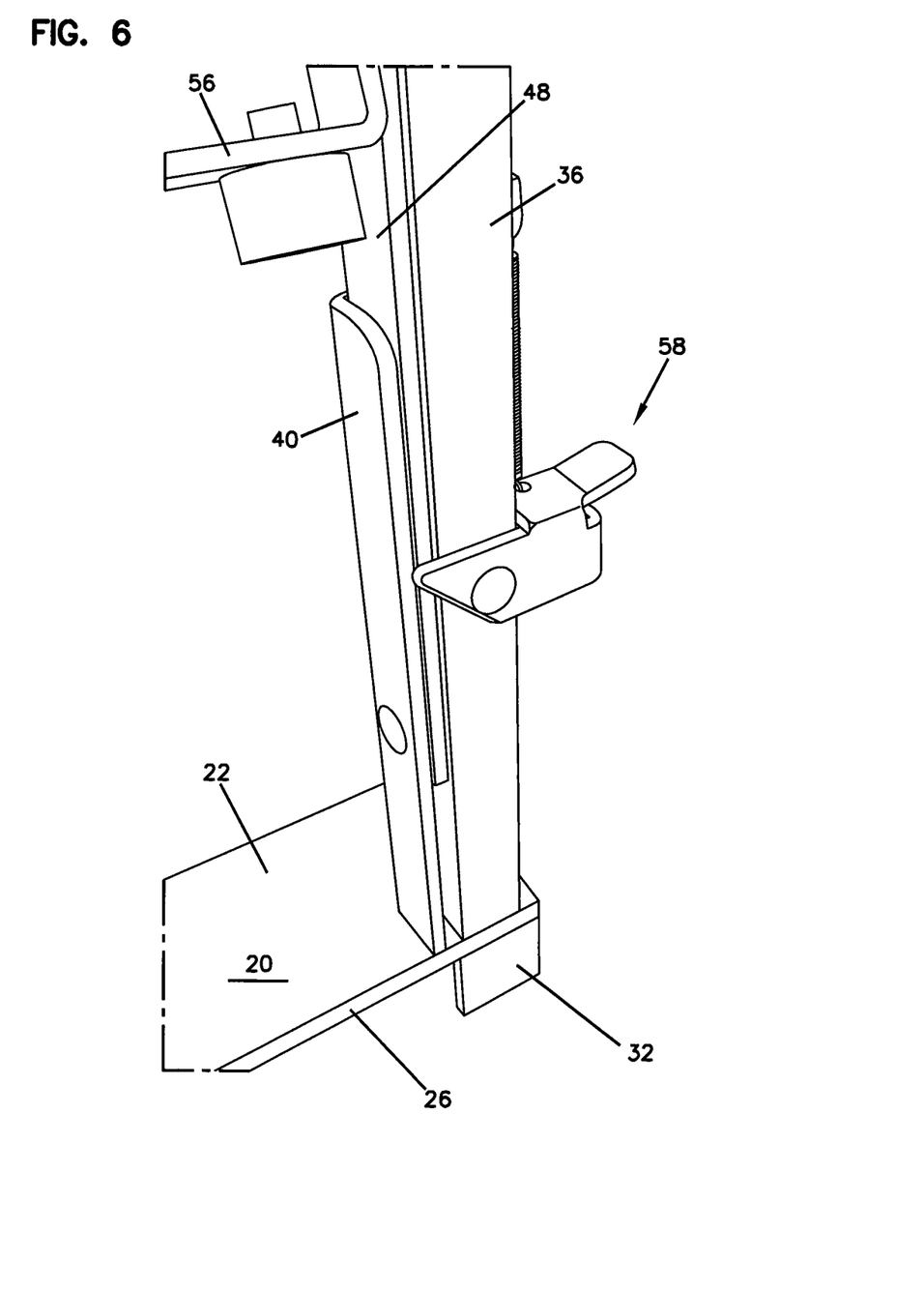
FIG. 6 is an enlarged perspective view of a portion of the pivoting ladder section of the portable ladder system locked to the handrail.
Figure 7:
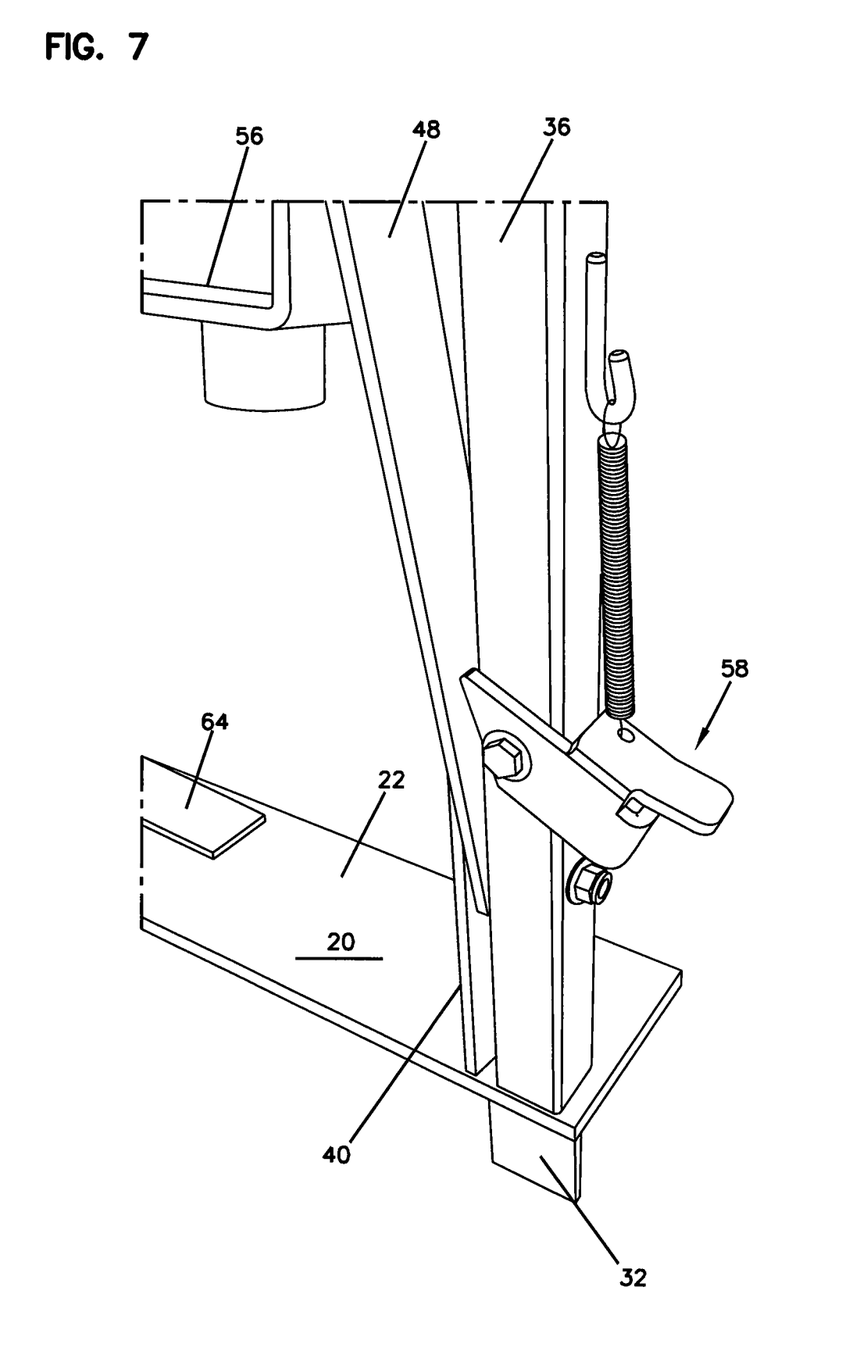
FIG. 7 is an enlarged perspective view of a portion of the pivoting ladder section of the portable ladder system unlocked from the handrail.
Figure 8:
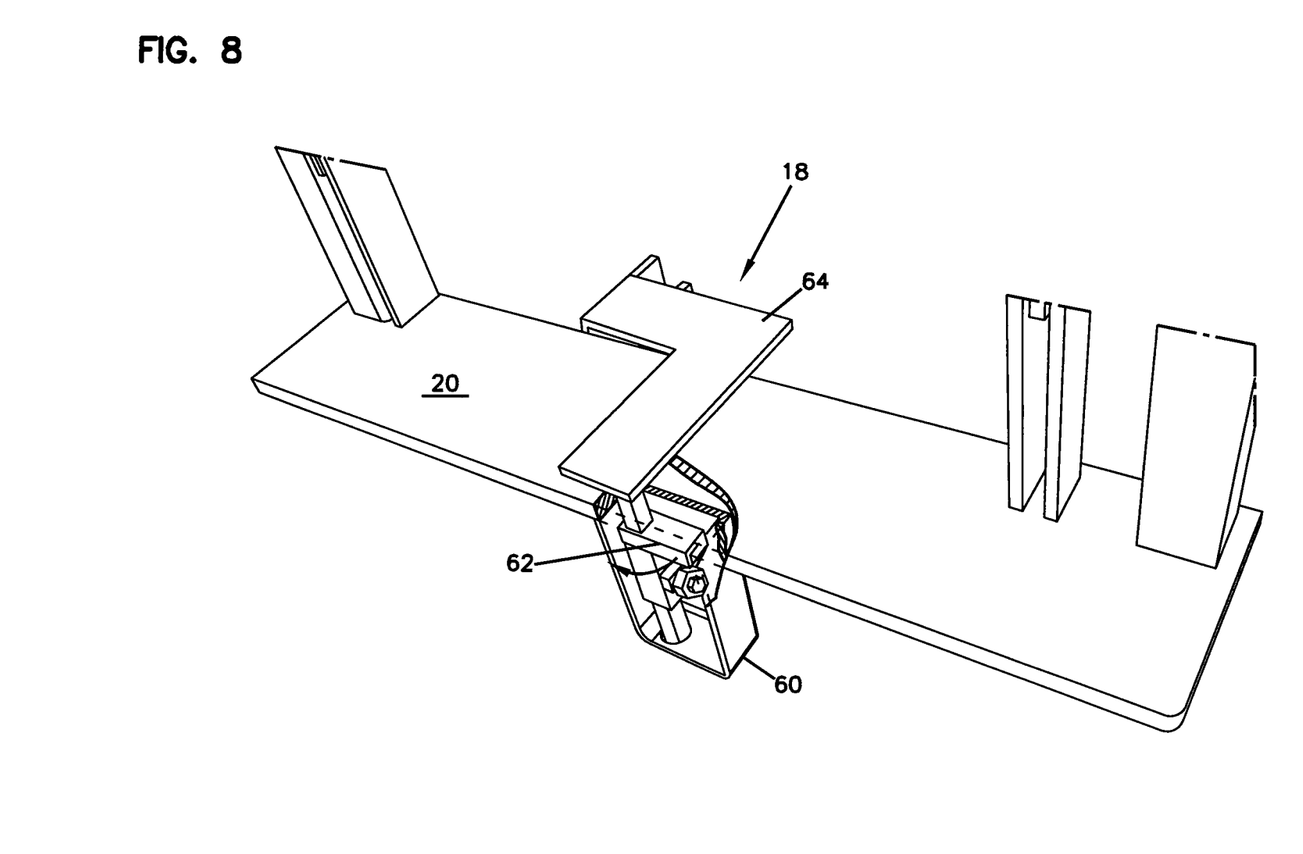
FIG. 8 is a rear perspective view of the portable ladder system of FIG. 1 with a section of the ladder support member removed with the actuating arm in an unlocked position.
Figure 9:
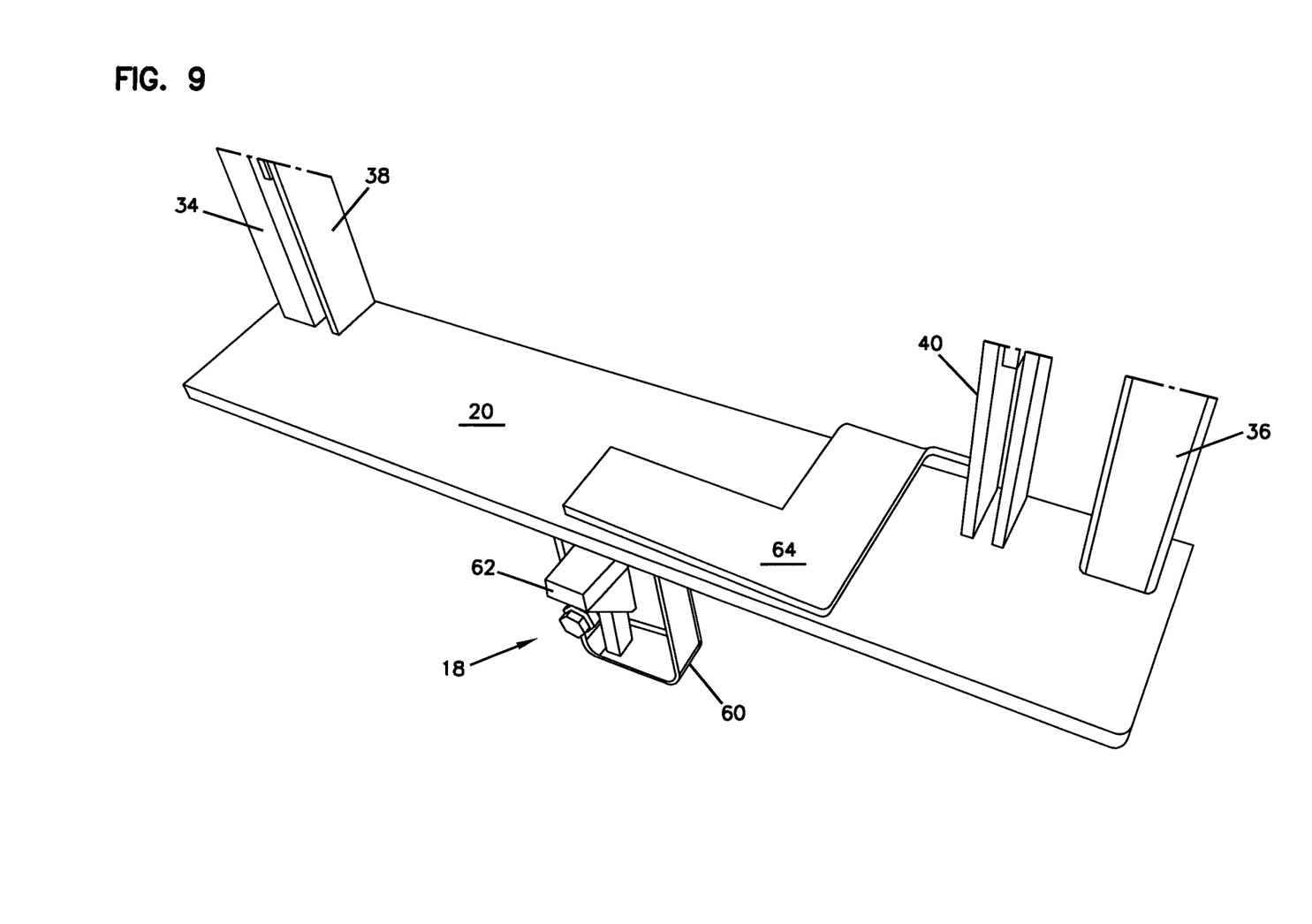
FIG. 9 is a rear perspective view of the portable ladder system of FIG. 1 showing a section of the ladder support member with the actuating arm in a locked position.
Figure 10:
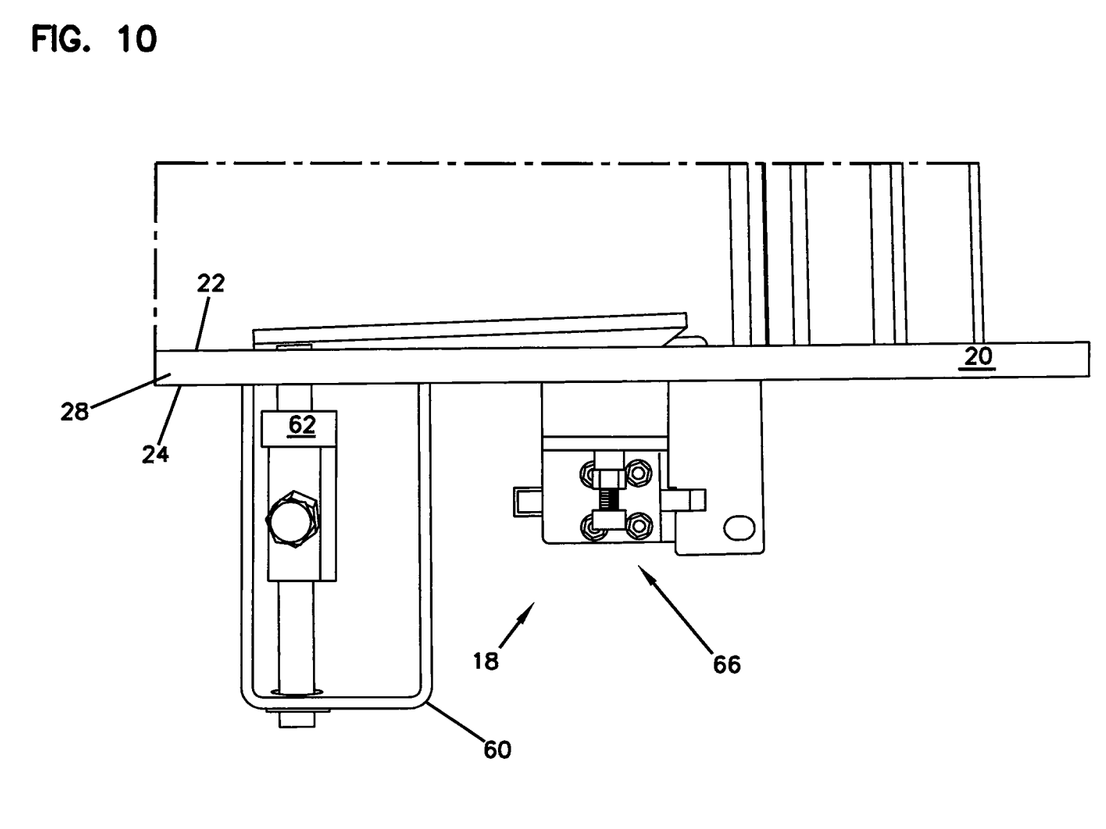
FIG. 10 is a rear perspective view of a portion of the locking assembly of the portable ladder system of the present disclosure.
Figure 11:
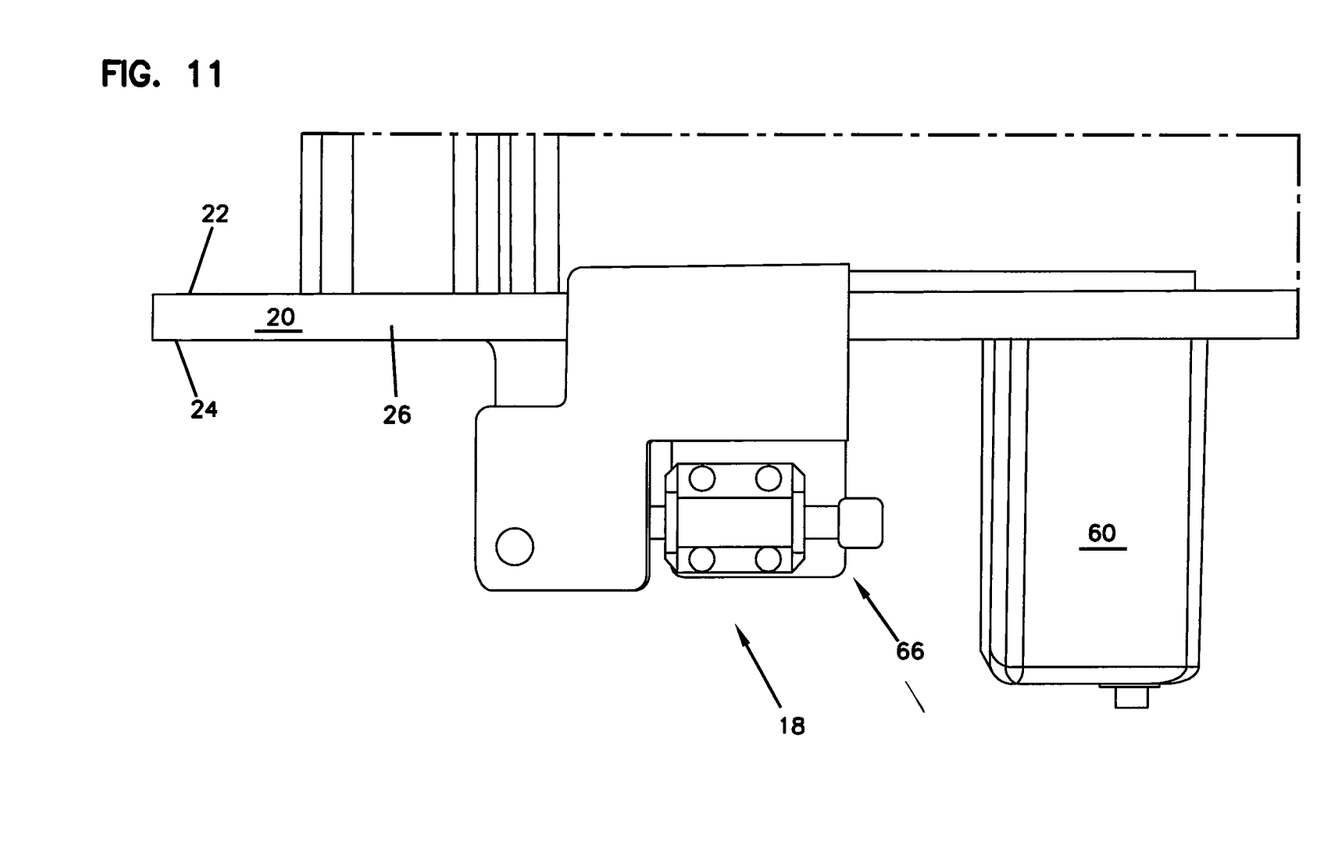
FIG. 11 is a front elevation view of a portion of the locking assembly of the portable ladder system of the present disclosure.

In the depicted embodiment, the pivoting ladder section 14 includes a first step member 42 and a second step member 44 affixed between a pair of side ladder bars 46, 48. The pivoting ladder section 14 has a first end portion 50 and a second end portion 52 (FIG. 5). The first end portion 50 is pivotally attached to the ladder support arms 38, 40 of the ladder support member 16 such that the pivoting ladder section 14 can pivot between a use position, in which the pivoting ladder section 14 is inclined at an angle relative to vertical (e.g., 60 degrees wherein vertical is 90 degrees) with the second end portion 52 of the pivoting ladder section 14 being located below the ladder support member 16, and a stowage position in which the second end portion 52 of the pivoting ladder section 14 is located above the ladder support member 16. In the depicted embodiment, the portable ladder system 10 further includes a pneumatic cylinder 54 mounted between the pivoting ladder section 14 and the ladder support member 16. In the depicted embodiment, the pivoting ladder section 14 includes a standoff bracket 56 that is configured for supporting the pivoting ladder section 14 against the bed 12 in an inclined position relative to vertical. In the depicted embodiment, the standoff bracket 56 is configured to make contact with the side of the bed 12. In the depicted embodiment, the portable ladder system 10 includes a locking mechanism 58 that locks the pivoting ladder section 14 to prevent it from pivoting relative to the ladder support member 16. In the depicted embodiment, the locking mechanism 58 locks the pivoting ladder section 14 to at least one of the grab rails 34, 36.

It should be appreciated that many alternative configurations of the pivoting ladder section 14 are possible. For example, in some alternative embodiments, the pivoting ladder section 14 includes only a single bar that supports the steps. In certain other embodiments, only a single grab rail such as one of the grab rails 34, 36 may be used. In addition, the standoff bracket 56 could alternatively be a structure that limits the pivot range such that the angle of the ladder in the use positon is less than vertical without contacting the truck bed 12. Many alternative configurations are possible.

In the depicted embodiment, the ladder securing system 18 is configured to secure the ladder support member 16 to an aperture along the edge of a truck or trailer bed. In the depicted embodiment, the ladder securing system 18 includes a bed engaging projection 60 that extends downwardly from the bottom of the support plate 20 and is configured to be inserted into an aperture on the periphery edge of the bed 12. The ladder securing system 18 includes a locking assembly that includes a locking boss 62 that is housed in the bed engaging projection 60. The locking boss 62 is configured to extend and retract from the bed engaging projection 60 towards and away from the center of the bed 12.

In the depicted embodiment, the locking boss 62 is connected to an actuating arm 64 such that rotation of the actuating arm 64 causes the locking boss 62 to extend and retract from the bed engaging projection 60. In the depicted embodiment, the actuating arm 64 shares a pivot axis with the locking boss 62. In the depicted embodiment, the actuating arm 64 includes a plate portion that is parallel to the ladder support plate 20 such that the actuating arm 64 can be stepped on by the user when the ladder is in the use position. The shared pivot axis extends vertically through the ladder support member 16 such that swinging the actuating arm 64 about the pivot axis rotates the locking boss 62. In the depicted embodiment, the extension and retraction of the locking boss 62 is due to rotation of the locking boss 62. In the depicted embodiment, the locking boss 62 is vertically adjustable and removably connected to the actuating arm 64. This configuration allows for the size or the vertical position of the locking boss 62 to be changed if needed.

In the depicted embodiment, the ladder securing system 18 includes an actuating arm lock 66 that is configured to lock the actuating arm 64 in place when the actuating arm 64 has moved (e.g., rotated) the locking boss 62 to its extended position. In the depicted embodiment, the actuating arm lock 66 is connected to the actuating arm 64 and is configured to automatically lock onto the tab 30 that extends downwardly from the ladder support member 16 when the actuating arm 64 is rotated toward the ladder support member 16. In the depicted embodiment, the actuating arm lock 66 requires manual disengagement to unlock (e.g., against a spring force that keeps the actuating arm lock 66 engaged with the tab 30). This configuration prevents inadvertent disengagement of the ladder system 10 from the bed 12.

The present disclosure provides a method of attaching a portable ladder system 10 to a bed 12 of a truck or trailer. In the depicted embodiment, the method of connecting the portable ladder system 10 to the bed 12 of a truck or trailer comprises the steps of: aligning a downwardly extending projection of the portable ladder system 10 with an aperture along an edge of the bed 12 and pivoting the actuating arm 64 about a vertical axis from an unlocked position to a locked position to lock the portable ladder system 10 to the bed 12. In the depicted embodiment, the step of pivoting the actuating arm 64 about a vertical axis from an unlocked position to a locked position extends the locking boss 62 from the bed engaging projection 60 to a positon beyond the periphery of the aperture in the bed. In the depicted embodiment, the actuating arm 64 automatically locks when the actuating arm 64 is positioned in the locked position. The method further comprises the steps of: releasing the pivoting ladder section 14 and pivoting it downwardly to a deployed position. In the depicted embodiment, the step of releasing the pivoting ladder section 14 includes unlocking the pivoting ladder section 14 of a handrail.

In the depicted embodiment, the method further includes the steps of: pivoting a standoff bracket 56 into a downward position. The standoff bracket 56 positions the pivoting ladder section 14 against the bed 12 at a less than vertical angle. The method further includes the steps of: setting the position of the locking boss 62 relative to a ladder support plate member. The position can be adjusted depending on the geometry of the bed aperture.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

PARTS LIST

Portable ladder system 10
Bed 12
Pivoting ladder section 14

Ladder support member 16
Ladder securing system 18
Plate 20 (of the latter support member)
Top portion 22 (e.g., top surface of the plate 20)
Bottom portion 24 (e.g., bottom surface of the plate 20)
Outwardly facing edge the portion 26 (e.g., outwardly facing edge of the plate 20)
Inwardly facing edge portion 28 (e.g., inwardly facing edge of the plate 20)
Downwardly extending tabs 30, 32 (on outwardly facing edge of the plate 20)
Vertically extending grab rails 34, 36 (extending from plate 20)
Ladder support arm 38, 40 (extending from plate 20)
First step member 42 (pivoting ladder section 14)
Second step member 44 (pivoting ladder section 14)
Side ladder bars 46, 48 (pivoting ladder section 14)
First end portion 50 (upper portion of pivoting ladder section 14)
Second end portion 52 (lower portion of pivoting ladder section 14)
Pneumatic cylinder 54
Standoff bracket 56
Locking mechanism 58 (lock the pivoting ladder section 16 to the grab rail 36)
Bed engaging projection 60
Locking boss 62
Actuating arm 64
Actuating arm lock 66

The invention claimed is:

1. A portable ladder system for a truck or trailer bed comprising:
   a ladder support member configured to engage an edge of a bed, the ladder support member including a top portion, a bottom portion, an outwardly facing edge portion, and an inwardly facing edge portion, wherein the ladder support member is configured such that the bottom portion of the ladder support member rests on top of an edge of the bed with the outwardly facing edge portion of the ladder support member being further from a center line of the bed than the inwardly facing edge portion of the ladder support member;
   a pivoting ladder section having a plurality of steps affixed between a pair of side ladder members, the pivoting ladder section having a first end portion and a second end portion, wherein the first end portion is pivotally attached to the ladder support member for rotation of the ladder section between a use position wherein the ladder section is inclined at an angle relative to vertical with the second end portion of the pivoting ladder section being located below the ladder support member, and a stowage position wherein the second end portion of the pivoting ladder section is located above the ladder support member; and
   a securing system that secures the ladder support member to an aperture along the edge of the bed, the securing system including:
      a bed engaging projection that extends downwardly from the bottom of the ladder support member and is configured to be inserted into an aperture on the bed;
      a locking assembly including:
         a locking boss housed in the bed engaging projection, the locking boss configured to extend and retract from the bed engaging projection towards and away from the center of the bed;
         an actuating arm connected to the locking boss, wherein rotation of the actuating arm extends and retracts the locking boss; and
         an actuating arm lock that locks the actuating arm when the actuating arm has moved the locking boss to the extended position.

2. The portable ladder system of claim 1, wherein the ladder support member includes a plate that includes a pair of ladder support arms that extend upwardly from a top surface of the plate, wherein the pivoting ladder section is pivotally connected to the ladder support arms.

3. The portable ladder system of claim 1, further comprising a pneumatic cylinder mounted between the pivoting ladder section and the ladder support member.

4. The portable ladder system of claim 1, further comprising a handrail that extends upwardly from the ladder support member.

5. The portable ladder system of claim 1, further comprising a standoff bracket configured to support the pivoting ladder section inclined at an angle relative to vertical.

6. The portable ladder system of claim 1, wherein the locking boss is vertically adjustable and removably connected to the actuating arm.

7. The portable ladder system of claim 1, wherein the actuating arm lock engages automatically and requires manual disengagement.

8. The portable ladder system of claim 1, wherein the actuating arm shares a pivot axis with the locking boss, wherein the pivot axis extends vertically through the ladder support member such that swinging the actuating arm about the pivot axis rotates the locking boss, wherein the extension and retraction of the locking boss is due to rotation of the locking boss.

9. The portable ladder system of claim 1, wherein the actuating arm lock is connected to the actuating arm and is configured to automatically lock onto a tab that extends downwardly from the ladder support member when the actuating arm is rotated toward the ladder support member.

10. A method of connecting a portable ladder system to a bed comprising the steps of:
    aligning a downwardly extending projection of the portable ladder system with an aperture along an edge of the bed; and
    pivoting an actuating arm about a vertical axis from an unlocked position to a locked position to lock the portable ladder system to the bed;
    wherein the step of pivoting the actuating arm about a vertical axis from an unlocked position to a locked position extends a locking boss from the downwardly engaging projection to a position beyond the periphery of the aperture in the bed.

11. The method of claim 10, wherein the actuating arm automatically locks when the actuating arm is positioned in the locked position.

12. The method of claim 10, further comprising the step of releasing a pivoting ladder section of the portable ladder system and pivoting the ladder section downwardly to a use position.

13. The method of claim 12, wherein the step of releasing the pivoting ladder section includes unlocking the pivoting ladder section from a handrail of the portable ladder system.

14. The method of claim 10, further comprising the step of pivoting a standoff bracket into a downward position.

15. The method of claim 10, further comprising the step of setting the position of a locking boss relative to a ladder support plate member.

16. The method of claim 15, wherein the actuating arm includes a plate portion that is parallel to the ladder support plate member.

17. A method of connecting a portable ladder system to a bed comprising the steps of:
- aligning a downwardly extending projection of the portable ladder system with an aperture along an edge of the bed;
- pivoting an actuating arm about a vertical axis from an unlocked position to a locked position to lock the portable ladder system to the bed; and
- pivoting a standoff bracket into a downward position.

18. A method of connecting a portable ladder system to a bed comprising the steps of:
- aligning a downwardly extending projection of the portable ladder system with an aperture along an edge of the bed;
- pivoting an actuating arm about a vertical axis from an unlocked position to a locked position to lock the portable ladder system to the bed; and
- releasing a pivoting ladder section of the portable ladder system and pivoting the ladder section downwardly to a use position; wherein the step of releasing the pivoting ladder section includes unlocking the pivoting ladder section from a handrail of the portable ladder system.

* * * * *